United States Patent [19]
Takechi et al.

[11] Patent Number: 6,021,957
[45] Date of Patent: Feb. 8, 2000

[54] AUTOMOTIVE AIR CONDITIONER WITH WARM AIR BYPASS PASSAGE TO BOOST HEATING CAPACITY

[75] Inventors: Tetsuya Takechi, Kariya; Yasuhiro Sato, Obu; Toshihiko Muraki, Kariya; Katsutoshi Hirose, Toyota; Kazuo Kito, Nagoya, all of Japan

[73] Assignee: Denso Corporation, Kariya, Japan

[21] Appl. No.: 09/158,207

[22] Filed: Sep. 22, 1998

[30] Foreign Application Priority Data

Oct. 2, 1997 [JP] Japan ................................. 09-270077

[51] Int. Cl.⁷ ..................................................... B60H 1/02
[52] U.S. Cl. .................. 237/12.3 A; 165/42; 237/12.3 R
[58] Field of Search ............................. 237/12.3 A, 2 A, 237/12.3 R; 165/42, 43

[56] References Cited

U.S. PATENT DOCUMENTS 4,420,115 12/1983 Matsushima et al. .............. 237/12.3 R
4,702,307 10/1987 Ito et al. ............................. 237/12.3 A

*Primary Examiner*—Henry Bennett
*Assistant Examiner*—Derek S. Boles
*Attorney, Agent, or Firm*—Harness, Dickey & Pierce, PLC

[57] ABSTRACT

A motor vehicle air conditioner that is operative to cause the quantity of conditioned air to change smoothly when an air conditioner bypass passage is opened/closed. When a user switches a typical automotive air conditioner between a bi-level flow mode and a full outer-air mode, a warm-air bypass door does not stop at an intermediate position, thus causing both air quantity of conditioned air and blown-air temperature of conditioned air to change greatly. In the air conditioner of the present invention, the air conditioner warm-air bypass door stops once at an intermediate position, thus enabling the air quantity of the conditioned air and the temperature change in the blown-air to change gradually.

11 Claims, 6 Drawing Sheets

AUTOMOTIVE AIR CONDITIONER WITH WARM AIR BYPASS PASSAGE TO BOOST HEATING CAPACITY

CROSS-REFERENCE TO RELATED APPLICATION

This application is related to, and claims priority in, Japanese Patent Application Hei. 9-270077, the contents of which are incorporated herein by reference.

BACKGROUND

1. Technical Field

This invention relates generally to automotive air conditioners, and particularly to an automotive air conditioner that includes a warm-air bypass passage to boost heating capacity.

2. Discussion

Conventionally, an automotive air conditioner includes an air-mixing door to regulate the mixing ratio of chilled air, which has passed through an evaporator and bypassed a heater core, and warm air which has passed through the heater core.

In many conventional automotive air conditioning systems, the chilled-air passage through which chilled air flows is disposed above the heater core, and the warm-air passage through which the warm air flows extends from below to above the heater core, so that the chilled air and the warm air are mixed within the air-mixing chamber in the space above the heater core. Subsequently, after the chilled air and warm air are mixed by the air-mixing door, warm air flowing in an upward direction is reversed so as to flow in a downward direction, and then is blown from through a foot vent.

Additionally during a maximum heating condition, the air-mixing door causes all chilled air passing through the evaporator to pass through the heater core, and all conditioned air flows through the warm-air passage and blows through the foot vent. The blown-air path to the foot vent requires that the blown air direction to be reversed, as described above, thereby increasing air resistance and the production of conditioned air.

As a result, in such conventional systems, a bypass passage operative to cause the warm air to bypass the warm-air passage, and a bypass door operative to open and close the bypass passage, are provided. During maximum heating, the warm-air bypass door opens the bypass passage, thereby reducing air resistance and improving heating capacity.

However, when the bypass passage is abruptly opened or closed by the warm-air bypass door as warm air is blown through the foot vent, air resistance abruptly changes, and air quantity changes suddenly due to the switching of the warm-air bypass door. As a result, the blown-air temperature also fluctuates.

SUMMARY OF THE INVENTION

In this regard, it is an object of this invention to cause air quantity of conditioned air to change smoothly when opening or closing a bypass passage.

To achieve the foregoing object, the present invention provides a warm-air bypass door operated within a predetermined operating range. The door opens and closes an inlet portion, and is stopped once at an intermediate position (b) in the predetermined operating range. As a result, conditioned-air quantity and blown-air temperature can be changed gradually.

DETAILED DESCRIPTION OF THE PREFERRED EMBODIMENTS

Embodiments of this invention will be described hereinafter with reference to the drawings. FIGS. 1–5 depict a first embodiment of the present invention. This invention finds application in an air conditioner of a motor vehicle, wherein it is difficult to secure an adequate heat source for heating use, such as a vehicle having a diesel engine, an electric vehicle, or a hybrid vehicle.

Figure 1:
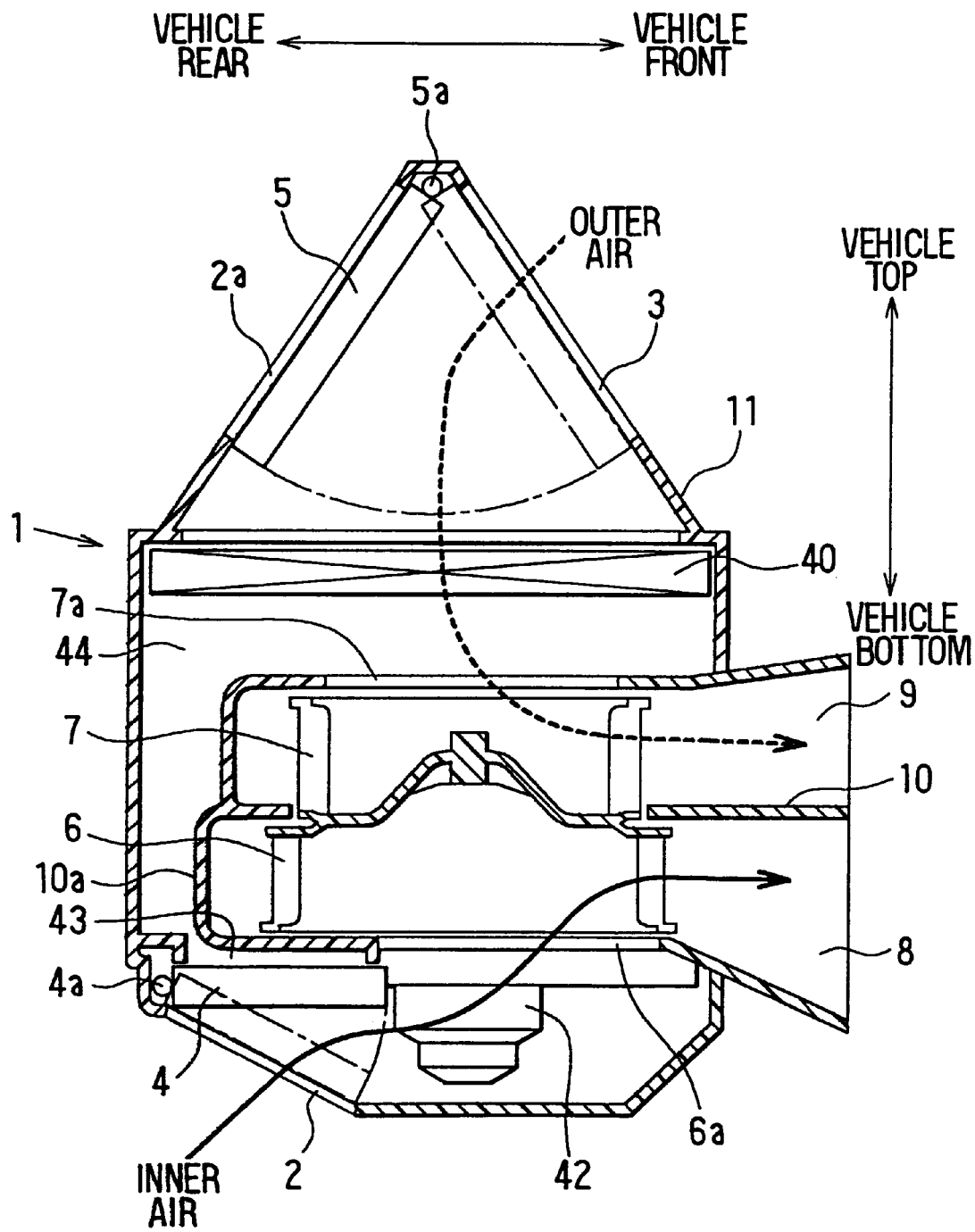
FIG. 1 is a structural view of an inner/outer air-conditioner according to a first embodiment of the present invention.
Figure 2:
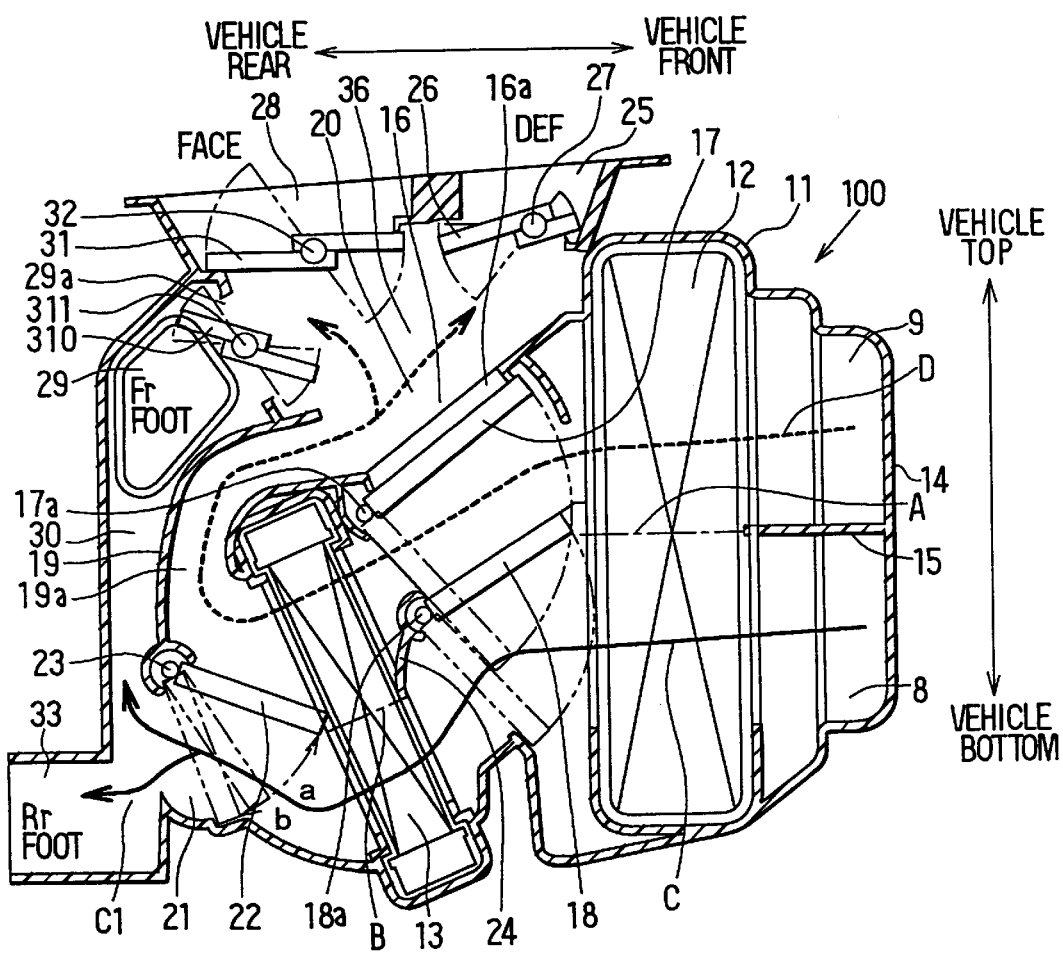
FIG. 2 is a structural view of an automotive air-conditioner according to the embodiment of FIG. 1.

An air-conditioner air-blowing system in this embodiment is divided into two main portions: a blower unit 1 shown in FIG. 1, and an air-conditioning unit 100 shown in FIG. 2. The blower unit 1 is disposed within a passenger compartment, below an instrument panel and offset from the central portion toward the passenger seat. The blower unit 1 is provided with first and second inner-air induction ports 2, 2a to introduce air into the passenger compartment, and an outer-air induction port 3 to introduce air outside the passenger compartment.

Here, the outer-air induction port 3 and the inner-air induction ports 2, 2a are adjacently disposed in the upper portion of the blower unit 1, and are switchably opened and closed by a second inner/outer-air switching door 5. The first inner-air induction port 2 is disposed in the lower portion of the blower unit 1, and is opened and closed by a first inner/outer-air switching door 4.

The two inner/outer-air switching doors 4, 5 are affixed to and rotated around rotating shafts 4a, 5a. The inner/outer-air switching doors 4, 5 are operated in an interlocking manner in accordance with an inner/outer air-introduction mode control signal of the air conditioner by an actuator such as a link mechanism or a servomotor (not illustrated).

An air filter 40 purifies air introduced from the outer-air induction port 3. The inner-air induction ports 2, 2a are disposed on a lower side of the inner/outer-air switching door 5. A first fan 6 and a second fan 7 blow air introduced from the foregoing induction ports 2, 2a and 3 and are disposed inside the blower unit 1 on a lower side of the air filter 40. The fans 6, 7 are preferably centrifugal multi-vane fans of known art, are rotatably driven concurrently by a single shared motor 42, and are disposed below the first fan 6 on the inner-air side.

An intake port 6a on the first fan 6 is communicable with the inner-air induction port 2, and is communicable via a communicating passage 43 with a space 44 on the downstream side of the air filter 40. The first inner/outer-air switching door 4 also opens and closes the communicating passage 43 in an interlocking manner with the opening and closing of the inner-air induction port 2.

FIG. 1 indicates the state of the bilevel flow mode which will be described later. The first inner/outer-air switching door 4 opens the first inner-air induction port 2 and closes the communicating passage 43 communicating with the outer-air induction port 3. Thus, the intake port 6a of the first (inner-air side) fan 6 takes in inner air. Meanwhile, second inner/outer-air switching door 5 closes the second inner-air induction port 2a and opens the outer-air induction port 3. Thus, an intake port 7a on the second (outer-air side) fan 7 takes in outer air via the air filter 40.

Consequently, in this state, the first fan 6 blows inner air from the first inner-air induction port 2 to a first (inner-air side) passage 8, and the second fan 7 blows outer air from the outer-air induction port 3 to a second (outer-air side) passage 9. The first and second passages 8, 9 are partitioned by a partitioning panel 10 disposed between the first fan 4 and the second fan 5. This partitioning panel 10 is formed integrally with a scroll casing 10a made of resin, and houses the fans 6, 7.

The air-conditioning unit 100 will be described next with reference to FIG. 2. The air-conditioning unit 100 is a type which integrally incorporates both an evaporator (heat exchanger for cooling use) 12 and a heater core (heat exchanger for heating use) 13 within an air-conditioner case 11.

The air-conditioner case 11 includes molded pieces of a resin such as propylene having a certain amount of elasticity as well as superior strength, and is composed of a laterally divided two-piece case having a divided surface in the vertical direction, as shown in FIG. 2. This laterally divided two-piece case houses equipment such as the foregoing heat exchangers 2, 13 and doors which will be described later, and thereafter is integrally joined by, for example, metal spring clips or screws.

The air-conditioning unit 100 is disposed in the lower portion of the vehicle instrument panel. An air-influx port 14 is disposed at a location on the air-conditioner case 11 closest to the front of the vehicle, and conditioned air blown from the blower unit 1 flows into the air-influx port 14. This air-influx port 14 opens to the side of the air-conditioner case 11 on the passenger-seat side, and is connected to an air-outlet portion of the blower unit 1 disposed in front of the passenger seat.

An evaporator 12 is longitudinally disposed inside the air-conditioner case 11 at a location immediately after the air-influx port 14, and traverses the first and second air passages 8, 9. The evaporator 12 absorbs latent evaporation heat of refrigeration-cycle refrigerant from conditioned air, thus cooling the conditioned air.

An air passage extending from the air-influx port 14 to the evaporator 12 is partitioned into the first air passage 8 on the vehicle lower side and the second air passage 9 on the vehicle upper side by a horizontally-extending partitioning panel 15, which is a fixed partition member integrally formed of resin.

The heater core 13 is disposed adjacent to the evaporator 12 on the air-flow downstream side thereof, with a predetermined interval interposed therebetween. This heater core 13 reheats chilled air which has passed through the evaporator 12. High-temperature engine coolant water (hot water) flows inside the heater core 13, and the heater core 13 employs this coolant water as a heat source to heat the air. This heater core 13, as with the evaporator 12, is of low profile in the longitudinal direction of the vehicle, and is disposed lengthwise within the air-conditioner case 11 in the vertical direction of the vehicle. The heater core 13 is also angled in a direction toward the rear of the vehicle.

A chilled-air bypass passage 16 through which air flows is formed within the air-conditioner case 11 at a location above the heater core 13. A main air-mixing door 17 and an auxiliary air-mixing door 18 of planar shape are disposed inside the air-conditioner case 11, between the heater core 13 and the evaporator 12. The main air-mixing door 17 and the auxiliary air-mixing door 18 regulate the air-quantity ratio of warm air heated by the heater core 13 and chilled air which bypasses the heater core 13. Here, these two air-mixing doors 17, 18 are integrally joined to respective horizontally-disposed rotating shafts 17a, 18a, and are rotatable about the rotating shafts 17a, 18a in a vertical direction.

The shafts 17a, 18a are rotatably supported by the air-conditioner case 11. The end portions on one end of the rotating shafts 17a, 18a protrude outside the air-conditioner case 11 and are joined to a link mechanism (not illustrated). The two air-mixing doors 17, 18 are operated in an interlocking manner in accordance with a blown-air temperature-control signal of the air conditioner via an actuator, such as the link mechanism, and a servomotor.

The rotating shaft 17a of the main air-mixing door 17 is disposed above the rotating shaft 18a of the auxiliary air-mixing door 18 with a predetermined interval interposed therebetween. The main and the auxiliary air-mixing doors 17, 18 are operable at discretionary rotating positions that do not interfere with one another. During maximum cooling, the two air-mixing doors 17, 18 are rotatably operated at mutually overlapping positions as indicated by double-dotted lines in FIG. 2. The two air-mixing doors 17, 18 are press-fitted to a protruding rib on the air-conditioner case side, and fully close the air-influx path to the heater core 13.

Meanwhile, during maximum heating, the two air-mixing doors 17 and 18 are rotatably operated at the solid-line positions in FIG. 2. When the main air-mixing door 17 fully closes an inlet hole 16a of the chilled-air bypass passage 16, then concurrently therewith, the auxiliary air-mixing door 18 acts as a movable partitioning member to partition the air passage between the evaporator 12 and the heater core 13 and to form the first air passage 8 and the second air passage 9, as the tip portion of the auxiliary air-mixing door 18 is located immediately after the evaporator 12 and proximate to extended line A of the partitioning panel 15.

The evaporator 12 is of a laminate type of known art, and is formed by arranging flat tubing, structured by joining two thin metal plates of aluminum or the like in a multiplicity of laminates, and integrally brazing same with corrugated fins interposed therebetween.

Inside the air-conditioner case 11, a vertically-extending partitioning wall 19 is integrally formed with the air-conditioner case 11 on the air-downstream side of the heater core 13, with a predetermined interval interposed between the partitioning wall 19 and the heater core 13. This partitioning wall 19 forms a first warm-air passage 19a oriented upwardly immediately after the heater core 13. The downstream side of this first warm-air passage 19a merges with the chilled-air bypass passage 16 at an upper portion of the heater core 13, forming a chilled-air/warm-air mixing space 20 to mix chilled air and warm air.

Additionally, a warm-air bypass inlet portion 21 is formed on a lower-end portion of the partitioning wall 19 to oppose the air downstream-side surface of the heater core 13. This warm-air bypass inlet portion 21 is opened and closed by a warm-air bypass door 22. This warm-air bypass door 22 is linked with a rotating shaft 23, is rotatably disposed on an upper-end portion of the warm-air bypass inlet portion 21, and rotates around the rotating shaft 23 between the solid-line position and the double-dotted line position of FIG. 2. With this embodiment, the warm-air bypass door 22 is operated in an interlocking manner via a link mechanism (not illustrated) by the actuator that drives the two air-mixing doors 17, 18.

In a foot-vent mode or foot-defroster vent mode, when a maximum-heating state (bi-level flow mode) has been set, the warm-air bypass door 22 acts as a movable partitioning member operated at the solid-line position (a position proximate to partitioning line B of the heater core 13) in FIG. 2 to partition the first warm-air passage 19a immediately after the heater core 13 and form the first air passage 8 and the second air passage 9.

This heater core 13 is of known art, and is formed of flat tubing made by bonding thin metal plates of aluminum or the like into a cross-sectionally flat configuration by welding or the like, by arranging this flat tubing in a multiplicity of laminates, and by integrally brazing same with corrugated fins interposed therebetween.

Additionally, a fixed partitioning plate 24 is integrally formed with the air-conditioner case 11 on an air-upstream side of the heater core 13, partitioning the interval between the partitioning line B thereof and the rotating shaft 17a of the auxiliary air-mixing door 18.

A defroster opening portion 25 is formed on the upper surface of the air-conditioner case 11. Temperature-controlled conditioned air from the chilled-air/warm-air mixing space 20 flows into this defroster opening portion 25, and toward the inner surface of a vehicle window via a defroster duct and a defroster vent. The defroster opening portion 25 is opened and closed by a defroster door 26 which is rotatable about a rotating shaft 27.

A face opening portion 28 is formed on the upper surface of the air-conditioner case 11, at a position more toward the rear of the vehicle than the defroster opening portion 25. Temperature-controlled conditioned air from the chilled-air/warm-air mixing space 20 passes through a communicating passage 36 and flows into this face opening portion 28, and from a face vent on an upper portion of the instrument panel, via a face duct (not illustrated).

Additionally, a front-seat foot opening portion 29 is formed on an upper-potion side of the vehicle-rear side surface of the air-conditioner case 11. Temperature-controlled conditioned air from the chilled-air/warm-air mixing space 20 passes through the communicating passage 36 and flows into this front-seat foot opening portion 29. During maximum heating, warm air from the warm-air bypass inlet portion 21 passes through a second warm-air passage 30 and flows into the front-seat foot opening portion 29, due to an opening on this warm-air bypass inlet portion 21, and from a front-seat foot vent, via a front-seat foot duct (not illustrated).

The face opening portion 28 is opened and closed by a face door 31 which is rotatable about a rotating shaft 32. An inlet hole 29a on the front-seat foot opening portion 29 is opened and closed by a foot door 310 which is rotatable about a rotating shaft 311.

Additionally, a rear-seat foot opening portion 33 is formed on a lower-portion side of the vehicle-rear side surface of the air-conditioner case 11, to oppose an area immediately after the warm-air bypass inlet portion 21. Warm air from the warm-air bypass inlet portion 21 and the second warm-air passage 30 flows into this rear-seat foot opening portion 33, and from a rear-seat foot vent, via a rear-seat foot duct (not illustrated).

With this embodiment, during the bi-level flow mode in a foot-vent mode, the warm-air bypass door 22 is operated at the solid-line position as shown to partition the first and second air passages 8, 9, with the first and second air passages 8, 9 being communicated via the communicating passage 36 near the inlet portion of the defroster opening portion 25, and the inlet portion of the front-seat foot opening portion 29.

The defroster door 26, the face door 31, and the foot door 310 are door devices for vent-mode switching, are interconnected with a link mechanism, and are operated in an interlocking manner in accordance with an actuator vent-mode control signal.

The above-described doors 4, 5, 17, 18, 22, 26, and 31 are each identical in basic structure, having a door base plate made of resin or metal integrally joined to a respective rotating shaft 4a, 5a, 17a, 18a, 23, 27, 32. An elastic sealing material such as urethane is affixed to both the front and back surface of the base plate.

Operation of the mechanical structural portion of the air conditioner will be described next with reference to FIG. 1 and FIG. 2. FIG. 1 and FIG. 2 depict a maximum heating state, and the bi-level mode is established in the foot-vent mode. In this state, in the inner/outer air unit 1, the first inner-air induction port 2 communicates with the intake port 6a of the first (inner-air side) fan 6, and the outer-air induction port 3 communicates with the intake port 7a on the second (outer-air side) fan 7. Consequently, in this state, the first fan 6 blows inner air from the inner-air induction port 2 to the first passage 8, and the second fan 7 blows outer air from the outer-air induction port 3 to the second passage 9.

In the air-conditioning unit 100, the two air-mixing doors 17, 18 are rotated to the solid-line positions shown in the drawings. When the main air-mixing door 17 fully closes the inlet hole 16a of the chilled-air bypass passage 16, the two air-mixing doors 17, 18 are positioned so that the tip portion of the auxiliary air-mixing door 18 is at a position immediately after the evaporator 12, and is shifted by a predetermined quantity toward the second air passage 9 from extended line A of the partitioning panel 15. Therefore, the auxiliary air-mixing door 18 acts as a movable partitioning member to partition the air passage between the evaporator 12 and the heater core 13 and form the first air passage 8 and the second air passage 9.

The warm-air bypass door 22 is rotated to the solid-line position shown in the drawings, and acts as a movable partitioning member to partition the first and second air passages 8, 9 immediately after the heater core 13, along with opening the warm-air bypass inlet portion 21.

Additionally, the defroster door 26 and the foot door 310 respectively open the defroster opening portion 25 and the inlet hole 29a of the front-seat foot opening portion 29 by a predetermined quantity. However, the face door 31 closes the face opening portion 28.

Consequently, due to operation of the fans 6, 7, inner air from the inner-air induction port 2 and outer air from the outer-air induction port 3 flow separately through the first air passage 8 and the second air passage 9 partitioned by the partitioning members 10, 15, 18, 22. All inner air and outer air passes through the heater core 13 and is heated to a maximum extent.

After inner air is heated by the heater core 13, the inner air passes through the warm-air bypass inlet portion 21 and passes through the second warm-air passage 30, reaching the front-seat and rear-seat foot opening portions 29, 33. In contrast to this, after outer air is heated by the heater core 13, the outer air passes through the first warm-air passage 19a above the warm-air bypass door 22, reaching the chilled-air/warm-air mixing space 20. Further, outer air therefrom is divided into two flow paths, one leading into the defroster opening portion 25, and the other passing through the communicating passage 36 and into the frontseat foot opening portion 29.

As a result of the above, warm air, which is heated low-humidity outer air, flows to the defroster opening portion 25. This low-humidity warm air is blown toward the inner surface of a vehicle window, for window antifogging purposes. Moreover, high-temperature warm air, which is chiefly heated inner air, is blown to the front-seat and rear-seat foot opening portions 29, 33, to thereby boost heater efficiency. In FIG. 2, arrow C indicates inner-air flow and arrow D indicates outer-air flow.

At this time, for the quantity of air blown to the defroster opening portion 25 and the ratio of the quantities of air blown to the foot opening portions 29, 33, a portion of the outer air on the second air passage 9 side can be made to flow on the front-seat foot opening portion 29 side by operating the defroster door 26 to a small-opening position. Thus, approximately 80% of the quantity of air can be blown to the foot opening portions 29, 33, and approximately 20% of the quantity of air can be blown to the defroster opening portion 25.

Next, in the foot-vent mode, when the two air-mixing doors 17, 18 are operated from the maximum-heating state to an intermediate-open position for controlling blown-air temperature, the air-conditioning unit 100 assumes a normal-mode state. In this normal-mode state, the two air-mixing doors 17, 18 are operated to the intermediate-open position, and the main air-mixing door 17 opens the chilled-air bypass passage 16. As a result, chilled air passing through this chilled-air bypass passage 16 bypasses the heater core 13 and reaches the chilled-air/warm-air mixing space 20 directly.

The warm-air bypass door 22 is operated at the double-dotted line position in FIG. 2, in an interlocking manner with the two air-mixing doors 17, 18, thereby closing the warm-air bypass inlet portion 21 together with reducing the partitioning effect for the first warm-air passage 19a immediately after the heater core 13.

Consequently, warm air passes through and is heated by the heater core 13, and is then mixed with chilled air from the chilled-air bypass passage 16 in the space 20 after the first warm-air passage 19a is raised, thereby reaching a predetermined temperature. A major portion of this warm air passes through the communicating passage 36, and is blown from the front-seat and rear-seat foot openings. The remainder of the warm air of the space 20 reaches the defroster opening portion 25 side and is blown toward the inner surface of a vehicle window.

In the foot-vent mode of the above-described normal mode, maximum heating capacity is not required, and so the inner/outer air-introduction mode is set to the full outer-air mode, which closes both the first and second inner-air induction ports 2, 2a and opens the outer-air induction port 3. However, a rider can manually set a full inner-air mode which opens both the first and second inner-air induction ports 2, 2a.

Additionally, in the foot-vent mode of this normal mode, the quantity of air blown to the front-seat and rear-seat foot opening portions 29, 33 is reduced by closing the warm-air bypass inlet portion 21, and so the opening of the foot door 310 is increased to a degree greater than that during the bi-level flow mode of FIG. 2. Due to this, the above-described decrease in the blown-air quantity can be prevented.

Next, when the maximum-heating state is established and the bi-level flow mode is set in the foot/defroster vent mode, the blown-air quantity from the front-seat and rear-seat foot opening portions 29, 33 and the blown-air quantity from the defroster opening portion 25 are substantially equalized, as the degree of opening of the defroster door 26 is increased compared with the opening degree during the foot-vent mode shown in FIG. 2.

As a result, the blown-air quantity from the defroster opening portion 25 can be increased, and it becomes possible to substantially equalize the blown-air quantity from the front-seat and rear-seat foot opening portions 29, 33 and the blown-air quantity from the defroster opening portion 25. Other features are identical to the bi-level flow mode in the foot-vent mode.

Next, in the foot/defroster vent mode, when the two air-mixing doors 17, 18 are operated from the maximum-heating state to an intermediate-open position for controlling blown-air temperature, the warm-air bypass door 22 is moved, as indicated by the double-dotted line position in FIG. 2, in an interlocking manner with the two air-mixing doors 17, 18, thus closing the warm-air bypass inlet portion 21. As a result, the bi-level flow mode is disabled, and a normal-mode state is enabled. This normal-mode state of the of the foot/defroster vent mode differs from the normal-mode state of the foot-vent mode solely with respect to the point of substantially equalizing the foot-side blown-air quantity and the defroster-side blown-air quantity, with other features being identical to the foot-vent mode.

Further, in the face-vent mode, in FIG. 2 the warm-air bypass door 22, the defroster duct 26, and the foot door 310 all assume a closed position, and the face door 31 alone is rotated to a fully open position. Accordingly, when the two air-mixing doors 17, 18 are operated to a maximum-cooling position (the double-dotted line position) the air-influx path to the heater core 13 is fully closed, and chilled air which has been chilled by the evaporator 12 is passed through the bypass passage, 16 and can be blown to the side of the face opening portion 28.

Accordingly, blown-air temperature in the face-vent mode can be adjusted as desired by rotating the two air-mixing doors 17, 18 from the maximum-cooling side to the maximum-heating side by a desired amount.

Additionally, in a high-level vent mode, the air passage to the side of the face opening portion 28, and the air passage to the foot opening portions 29, 33 side can be simultaneously opened by operating the foot door 310 to an open position with respect to the above-described face-vent mode. Due to this, chilled air from the chilled-air bypass passage 16 flows primarily to the side of the face opening portion 28, and warm air from the first warm-air passage 19a flows chiefly to the foot opening portions 29, 33. Thus, the blown-air temperature through the face opening portion 28 is lower than the temperature of the air blown through the foot opening portions 29, 33, and head-cooling, foot-warming blowing-temperature distribution can be obtained.

In the defroster-vent mode, the doors 31, 310, and 22 are all rotated to the closed position, and only the defroster door 26 is rotated to the fully open position of the defroster opening portion 25. Consequently, warm air temperature adjusted by the rotational position of the two air-mixing doors 17, 18 flows to the defroster opening portion 25, and window-defogging can be performed.

Figure 3:
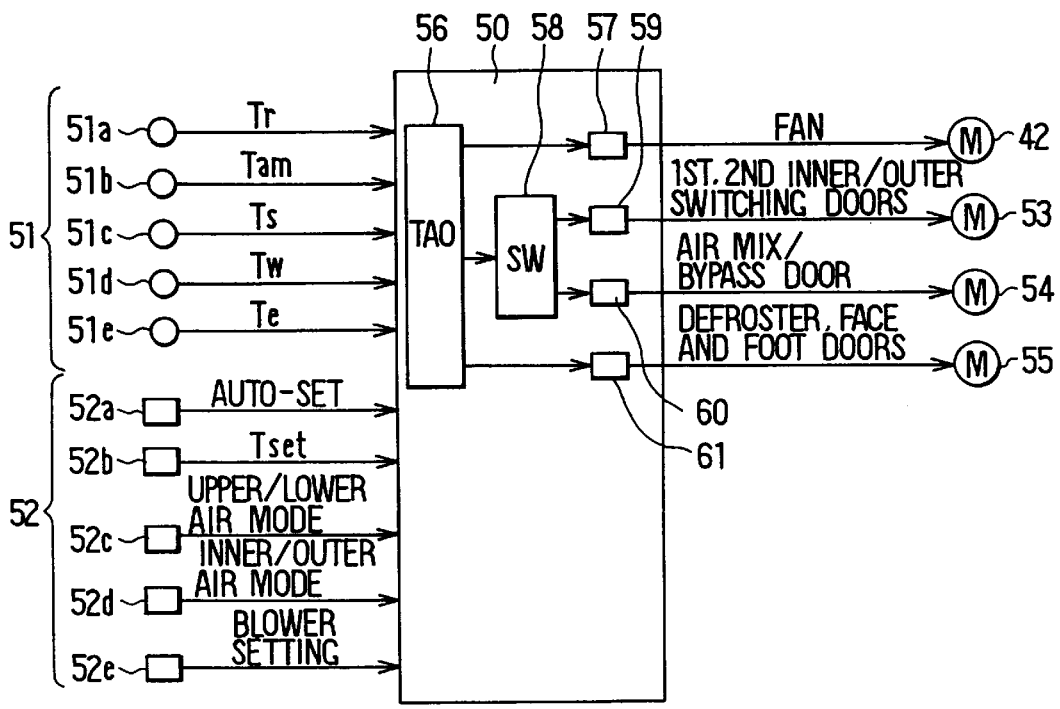
FIG. 3 is a diagram indicating a control system of the automotive air conditioner according to the embodiment of FIG. 1.

FIG. 3 is a system diagram depicting an overview of air-conditioning control according the above-described embodiment of the present invention. An electronic control unit for air-conditioning use 50 includes a microprocessor and other well-known control unit components. A sensor array 51 of known art for sensing various input signals, and a control-member array 52 for generating various control signals, are provided on an air-conditioner control panel (not illustrated). Signals from the arrays 51, 52 are input to the electronic control unit for air-conditioner control.

The electronic control unit controls several devices, including a servomotor 53 to drive the first inner/outer-air switching door 4 and the second inner/outer-air switching door 5 via a link mechanism. The electronic control unit also controls a servomotor to drive the main air-mixing door 17 and the auxiliary air-mixing door 18. This servomotor 54 drives the warm-air bypass door 22 in a region on the maximum-heating side exceeding a predetermined rotational-angle range whereat the two air-mixing doors 17, 18 are driven. A servomotor 55 drives the defroster door 26, the face door 31, and the foot door 310.

The electronic control unit 50 performs operational processing for the several input signals via programming stored in a memory such as a ROM, to control the various devices for air-conditioning use. To describe a control portion solely relating to this embodiment, a first calculating unit 56 calculates a target blown-air temperature TAO required to sustain the interior of the passenger compartment at an established temperature, and calculates the target temperature TAO of air blown into the passenger compartment on a basis of Equation 1, which is stored in the ROM.

$$TAO = Kset*Tset - Kr*Tr - Kam*Tam - Ks*Ts + C \quad \text{Equation 1}$$

Here, Tset is a set temperature of the temperature-setting control member of the air-conditioner control panel, Tr is inner-air temperature detected by an inner-air sensor, Tam is outer-air temperature detected by an outer-air sensor, Ts is amount of sunlight detected by a sunlight sensor, Kset, Kr, Kam, and Ks are gain, and C is a constant for compensation use.

A control unit 57 controls an electrical motor for blower-fan use 42. Fan-motor voltage corresponding to the above-described TAO is determined on a basis of a map stored in the ROM, and is applied to the motor 42. A second calculating unit 58 calculates a temperature-control operational value SW for determining a target opening degree for the air-mixing doors 17, 18. The second calculating unit 58 calculates this temperature-control operational value SW on a basis of Equation 2, which is stored in the ROM.

$$SW = ([TAO-Te]/[Tw-Te])*100(\%) \quad \text{Equation 2}$$

where Tw is temperature of water flowing into the heater core 13 detected by a water-temperature sensor, and Te is blown-air temperature of the evaporator 12 detected by an evaporator blown-air temperature sensor.

A control unit 59 of the servomotor 53 drives the inner/outer-air switching doors 4, 5. The control unit 59 controls electrification of the servomotor 53, and determines the motor rotational angle according to the foregoing temperature-control operational value SW on a basis of a map stored in the ROM.

A control unit 60 of the servomotor 54 drives the air-mixing doors 17, 18 and the warm-air bypass door 22. The control unit 60 controls enablement of the servomotor 54 and determines the motor rotational angle according to the foregoing temperature-control operational value SW, on a basis of a map stored in the ROM.

A control unit 61 of the servomotor 55 drives the vent-mode doors 26, 31, and 310. The control unit 61 controls enablement of the servomotor 55 and determines the motor rotational angle according to the above-described target blown-air temperature TAO on a basis of a map stored in the ROM.

Figure 4:
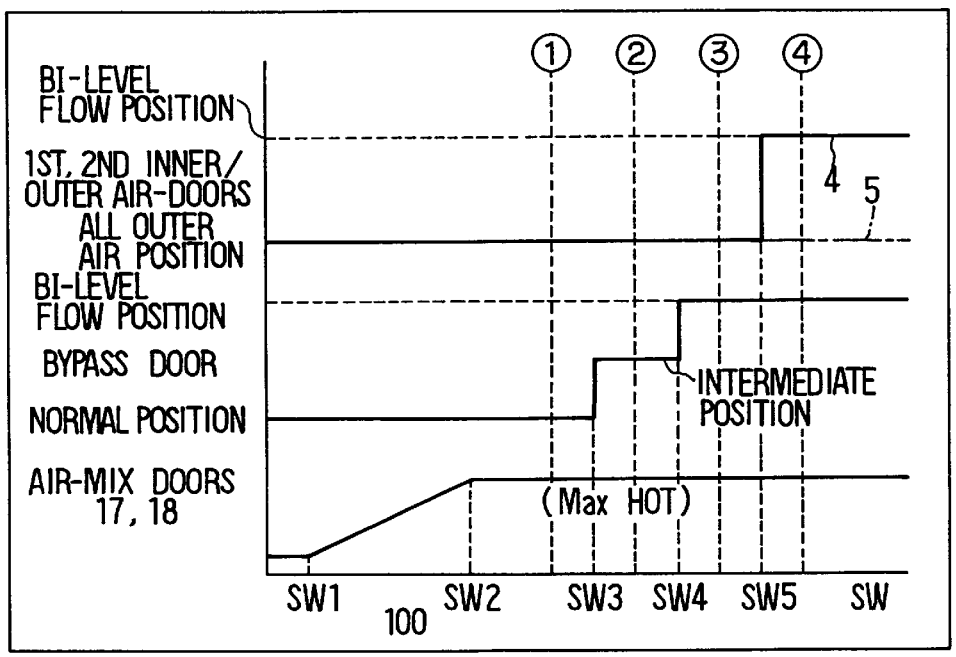
FIG. 4 is an operation diagram indicating the content of control of the automotive air conditioner according to the embodiment of FIG. 1.

Next, FIG. 4 depicts an example of door-control content according to the above-described temperature-control operational value SW in this embodiment. In all vent modes except for the defroster-vent mode, the several doors are controlled as shown in FIG. 4. However, in the face mode and the high-level mode a maximum-heating mode is not required, and so the several doors are controlled in a region where the temperature-control operational value SW is less than SW2 (SW<SW2).

The door control in FIG. 4 will be described in specific terms hereinafter. When the temperature-control operational value SW is SW1 or less, the air-mixing doors 17, 18 are operated to a maximum-cooling position to fully open the chilled-air bypass passage 16 and to fully close the air paths to the heater core 13. At this time, with this embodiment, the warm-air bypass door 22 is rotated to a normal position to close the inlet portion 21. Additionally, with this embodiment, the inner/outer-air switching doors 4, 5 are rotated to the position of the full outer-air mode to close both inner-air induction ports 2, 2a and open the outer-air induction port 3.

When the temperature-control operational value SW exceeds SW1, the warm-air bypass door 22 is maintained at the normal position to close the inlet portion 21 during the interval until the temperature-control operational value SW reaches SW2, which is a large value compared with SW1. Additionally, the first and second inner/outer-air switching doors 4, 5 are maintained at the position of the full open-air mode. Meanwhile, during this interval the air-mixing doors 17, 18 continuously increase the opening degree of the air paths to the heater core 13, raising the blown-air temperature.

When the temperature-control operational value SW reaches SW2, the air-mixing doors 17, 18 are operated to the maximum-heating position to fully close the chilled-air bypass passage 16 and to fully open the air paths to the heater core 13. However, the warm-air bypass door 22 is still maintained at the normal position to close the inlet portion 21, and the first and second inner/outer-air switching doors 4, 5 are maintained at the position of the full outer-air mode.

When the temperature-control operational value SW reaches SW3, which is slightly larger than SW2, first, the warm-air bypass door 22 moves from the normal position to an intermediate position (the single-dotted line position in FIG. 2) of an intermediate location in the above-described predetermined operating range a, and the warm-air bypass 22 is stopped once at this intermediate location.

This stop is maintained until the temperature-control operational value SW increases and becomes SW4. When the temperature-control operational value SW becomes SW4, operation of the warm-air bypass door 22 restarts, and the warm-air bypass door 22 is moved to a bi-level flow position. That is to say, the warm-air bypass door 22 moves to a position to open the inlet portion 21 and partition the first warm-air passage 19a into the first and second air passages 8, 9. At this time, the first and second inner/outer-air switching doors 4, 5 are still maintained at the position of the full outer-air mode, and so a situation wherein the inner and outer air on the downstream side of the heater core 13 are temporarily mixed does not occur.

Further, when the temperature-control operational value SW reaches SW5, which is larger than SW4, the first inner/outer-air switching door 4 fully opens the first inner-air induction port 2 and fully closes the communicating passage 43. The second inner/outer-air switching door 5 is maintained at a state where the outer-air induction port 3 is constantly open in the range of SW>SW1, and so the inner/outer air introducing portion of the blower unit 1 assumes the inner/outer-air bi-level flow position for the first time when SW>SW5. That is to say, the timing (SW5) with which the inner/outer air introducing portion of the blower unit 1 switches to the inner/outer-air bilevel flow position is more delayed than the timing (SW4) with which the warm-air bypass inlet portion 21 switches from the normal position to the inner/outer-air bi-level flow position.

Conversely, in a case of switching from the bi-level flow mode to the full outer-air mode, at the time SW5, first, in the inner/outer air introducing portion of the blower unit 1, the first inner/outer-air switching door 4 moves to the full outer-air position. Thereafter, at the time SW4, the second inner/outer-air switching door 5 fully closes the first inner-air induction port 2 and fully opens the communicating passage 43, and so the inner/outer air introducing portion of the blower unit 1 is switched to the full outer-air mode.

At this time, however, the warm-air bypass door 22 is still maintained at the bi-level flow position, and so a situation wherein the inner and outer air on the downstream side of the heater core 13 are temporarily mixed does not occur. Thereafter, at the time SW4, the warm-air bypass door 22 moves as far as the intermediate position, and at the time SW3, the warm-air bypass door 22 returns from the intermediate position to the normal position.

When opening and closing the first inner-air induction port 2 in this way, the warm-air bypass door 22 is made to stop once at an intermediate location in the predetermined operating range (a) for reasons such as the following.

Namely, because opening and closing the warm-air bypass door 22 constitutes alteration of the air paths, the amount of conditioned air blown to the rear foot vent 33 and the amount of conditioned air blown to the front foot vent 29 change. For example, in a case where the rear foot vent 33 is in the bi-level flow mode, the flow of warm air which has passed through the heater core 13 is facilitated, as shown by arrow C1 in FIG. 1. However, when in the full outer-air mode, the warm-air bypass door 22 closes, and so after flowing through the first warm-air passage 19a, the flow direction of the warm air is reversed, thereby causing the warm air to flow further upward, and then downward and into the second warm-air passage 30 and on to the rear foot vent 33.

Consequently, when the bi-level flow mode and the full outer-air mode are switched without stopping the warm-air bypass door 22 at the intermediate position as was described above, the quantity of the conditioned air and blown-air temperature change greatly. In this regard, with this embodiment, by stopping the warm-air bypass door 22 once at the intermediate position in this case, the change in the quantity of the conditioned air and the change in the blown-air temperature can be smoothed.

Figure 5:
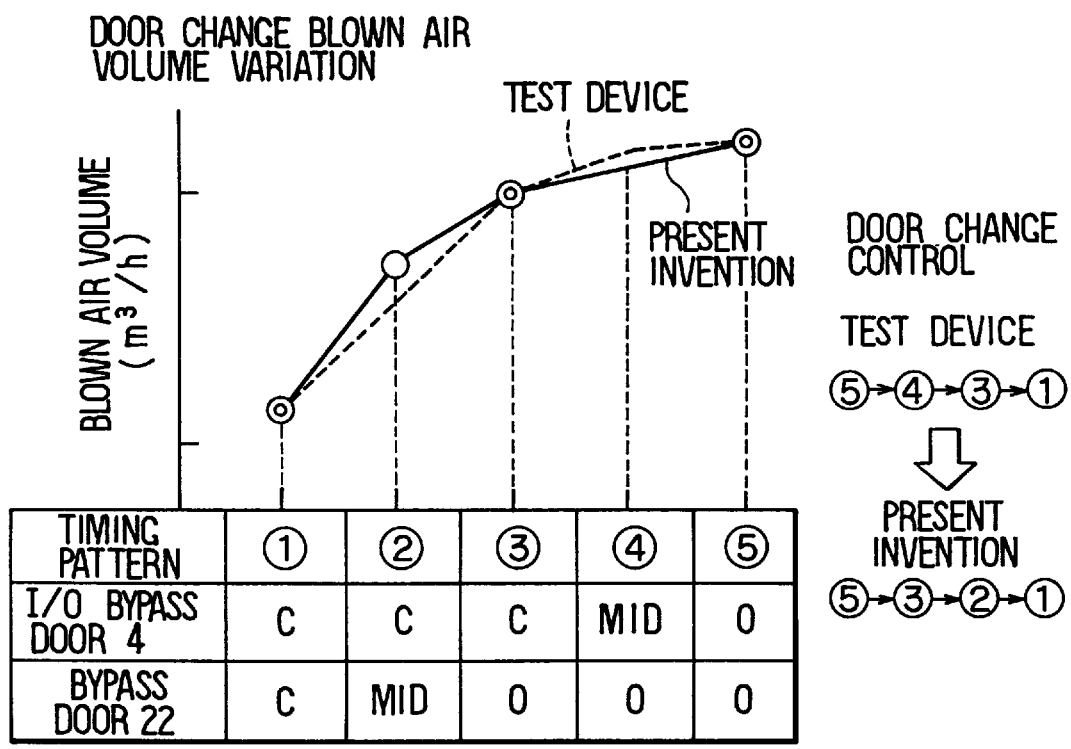
FIG. 5 is a diagram indicating change in air quantity according to the embodiment of FIG. 1.

FIG. 5 indicates behavior of change in air quantity of a conventional apparatus and an apparatus according to the present invention. As should be understood from an examination of this drawing, change in air quantity is smoother for the apparatus of the present invention than for the evaluated conventional apparatus. In FIG. 5, (1) through (5) represent the timing patterns shown in FIG. 4.

Figure 6:
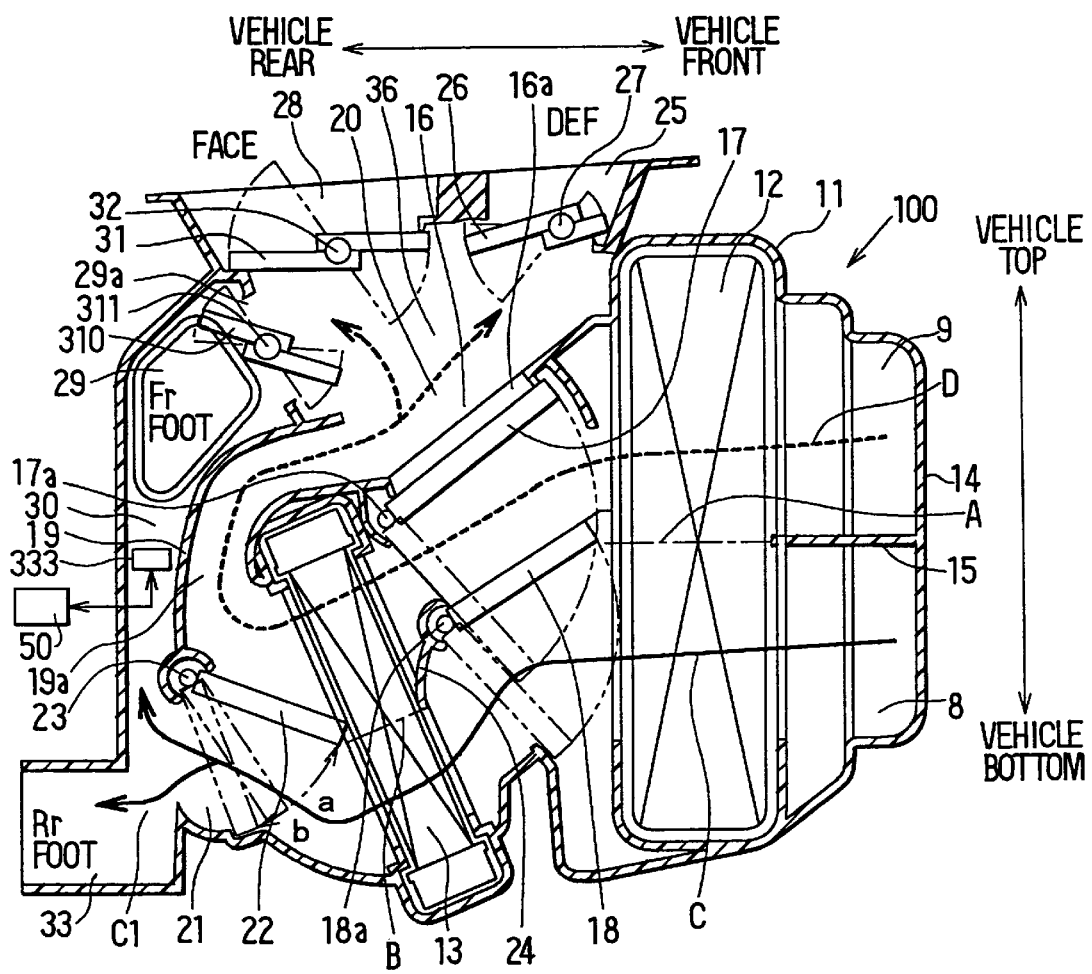
FIG. 6 is a structural view of an automotive air conditioner according to a second embodiment of the present invention.
Figure 7:
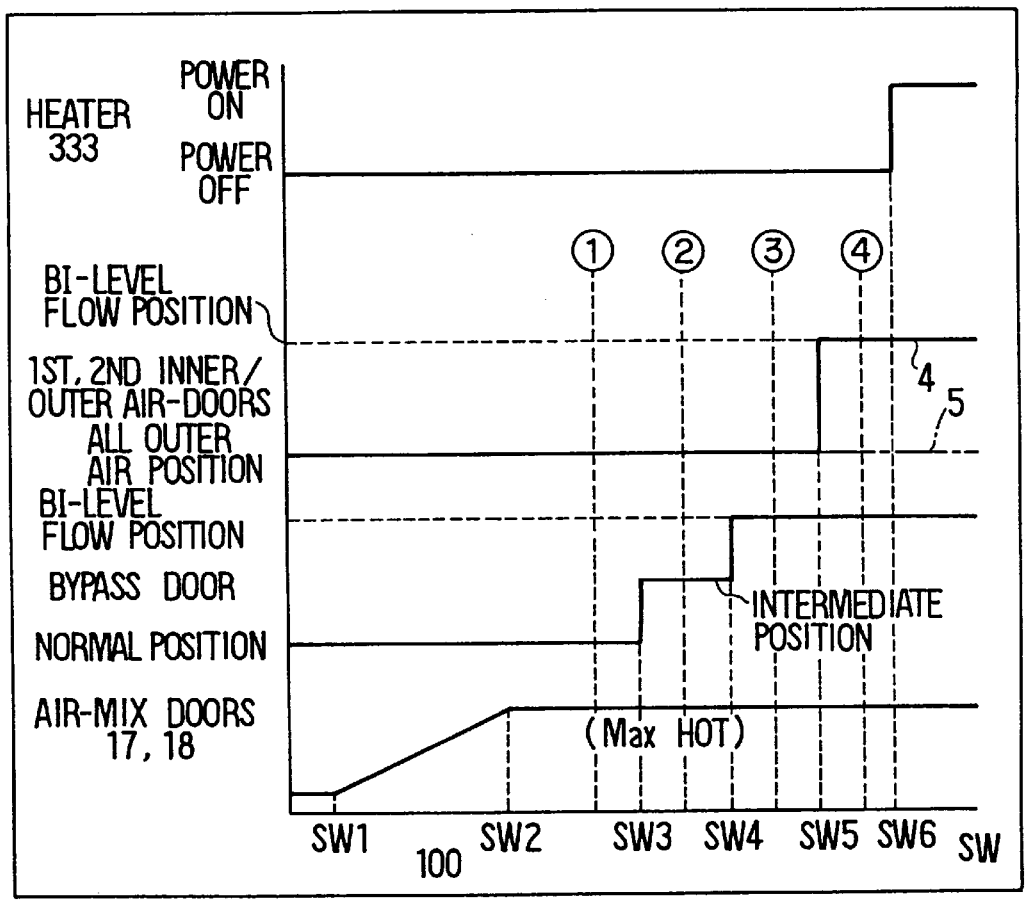
FIG. 7 is an operation diagram indicating the content of control of the automotive air conditioner according to the second embodiment.

Referring to FIGS. 6 and 7, a second embodiment of the present invention is shown. The second embodiment differs from the above-described first embodiment due to the auxiliary heater 333, which is an electrical heating unit in the second warm-air passage 30. This auxiliary heater 333 is an electrical element (PTC) of known art, having negative temperature-resistance characteristics to increase resistance when a predetermined temperature obtains and self-regulates the amount of heat generated.

Accordingly, this auxiliary heater 333 is enabled solely in the above-described bi-level flow mode. That is to say, in the bi-level flow mode, warm air flowing through the second warm-air passage 30 flows to the front foot vent 29, and so warm air (inner air) warmed by the auxiliary heater 333 is blown to the front-seat side within the passenger compartment.

The timing of control of the foregoing auxiliary heater 333 will be described next with reference to FIG. 7. FIG. 7 is identical to FIG. 4, with the addition of the timing for enablement and interruption of the auxiliary heater 333. The timing of enablement and interruption of the auxiliary heater 333 in FIG. 6 is controlled by the electronic control unit 50.

When the temperature-control operational value SW becomes SW6, which is larger than the above-described SW5, the auxiliary heater 333 is enabled. When the temperature-control operational value SW becomes smaller than SW6, the heater is disabled. That is to say, enablement of the auxiliary heater 333 is interrupted when the maximum-heating state is cleared and the bi-level flow mode is set to switching from the bi-level flow mode to the full outer-air mode.

In specific terms, enablement of the auxiliary heater 333 is interrupted before the first inner/outer-air switching door 4 moves from the bi-level flow position to the full outer-air position.

The reasons for the above operational process will be described hereinafter. First, because the auxiliary heater 333 consumes a large amount of electrical power in order to heat conditioned air sufficiently, it is utilized only when heating capacity truly cannot be supplied by the heater core 13. For this reason, the auxiliary heater 333 should be utilized solely in the above-described bi-level flow mode. That is to say, when the auxiliary heater 333 is used to obtain heater capacity while at other than the bi-level flow mode, it is better to boost heater capacity without consuming electrical power as in the bi-level flow mode.

Additionally, a problem such as the following may occur when operation of the auxiliary heater 333 is interrupted, for example, concurrently with the first inner/outer-air switching door 4 when the door switches to the full outer-air position at time SW5. Namely, the auxiliary heater 333 heats comparatively high-temperature inner air in the bi-level flow mode. Consequently, when switched from the bi-level flow mode to the full outer-air mode, low-temperature outer air flows through the second warm-air passage 30, and so the blown-air temperature drops sharply. When interruption of electrical power to the auxiliary heater 333 is also performed concurrently with this SW5 timing, fluctuation in the blown-air temperature becomes still larger.

For this reason, with this embodiment, prior to switching to the full outer-air mode, electrical power to the auxiliary heater 333 is first interrupted, and the full outer-air mode is enabled for the first time when the temperature-control operational value SW becomes SW5 thereafter. Owing thereto, fluctuation in blown-air temperature can be made yet more gradual.

With the above-described embodiments, a warm-air bypass door is applied in an air conditioner with a switchable bi-level flow mode, but this invention can be applied also in a general automotive air conditioner which does not partition the interior of the air-conditioner case into two passages.

Additionally, with the foregoing embodiments, a warm-air bypass door serves as a movable partitioning member to achieve a bi-level flow mode, but a fixed partitioning member may be employed to achieve the bi-level flow mode without employing a warm-air bypass door.

Further, with the foregoing several embodiments, an apparatus of the air-mixing type to mix chilled air and warm air and regulate blown-air temperature was described. However, this invention may also be structured as an apparatus to regulate the amount of hot-water supplied to the heater core 13.

What is claimed is:

1. An automotive air conditioner, comprising:
    a heat exchanger for heating conditioned air within an air-conditioner case;
    temperature adjusting means for adjusting a heated quantity of air conditioned by the heat exchanger and for adjusting air temperature;
    a foot opening portion connected to a passenger compartment foot vent;
    a first warm-air passage to induct air passing through the heat exchanger to the foot opening portion;
    a second warm-air passage to bypass the first warm-air passage and induct air passing through the heat exchanger directly to the foot opening portion; and
    a warm-air bypass door operative within a predetermined operating range for opening and closing an inlet portion of the second warm-air passage;
    wherein the warm-air bypass door is stopped once at an intermediate position in the predetermined operating range when operated to open or close the inlet portion to gradually change conditioned air quantity and temperature.

2. The automotive air conditioner of claim 1, further comprising:
    an inner/outer-air switching door member operative to control an inner-air quantity and an outer-air quantity inducted into the air-conditioner case, and a defroster opening portion connected to a defroster vent operative to vent air toward the inner surface of a vehicle window;
    wherein a conditioned air passage is partitioned to form a first air passage to induct inner air introduced by operating the inner/outer-air switching door member to the foot opening portion, and a second air passage to induct outer air introduced by operating the inner/outer-air switching door member to the defroster opening portion when the foot opening portion and the defroster opening portion are both simultaneously opened, when the temperature-adjusting means is operated at a location where the heated quantity is maximized and a maximum heating state is established; and
    the first air passage and the second air passage are structured so that the first warm-air passage is partitioned by operating the warm-air bypass door to open the inlet portion.

3. The automotive air conditioner of claim 1, further comprising:
    electrical means for heating inner air flowing through said first air passage when inner air flows through said first air passage and outer air flows through said second air passage in a bi-level flow mode, wherein:
    the electrical heating means is enabled to heat inner air when the bi-level flow mode is established; and
    the electrical heating means is disabled when the bi-level flow mode is established prior to the maximum heating state being canceled in the vent mode and prior to switching from the bi-level flow mode to a full outer-air mode.

4. The automotive air conditioner of claim 1, further comprising:
    a chilled-air bypass passage to cause a flow of conditioned air to bypass the heat exchanger; and
    a chilled-air/warm-air mixing space to mix chilled air from the chilled-air bypass passage and warm air from the first warm-air passage;
    the temperature-adjusting means being an air-mixing door to regulate an air-quantity ratio of an air quantity passing through the heat exchanger and an air quantity passing through the chilled-air bypass passage.

5. An automotive air conditioner for providing air to a passenger compartment at a desired temperature, and having an evaporator for cooling air and a heat exchanger for heating air, the air conditioner comprising:
    a housing that defines a plurality of air outlets, an air flow passage that channels conditioned air blown through the evaporator to one or more of the air outlets, the air flow passage including a cool air bypass passage that enables the conditioned air to bypass the heat exchanger and flow directly to the air outlets, a mixing chamber in which the heated air from the heat exchanger and the cooled air from the cool air bypass passage are mixed before passing to the air outlets, and a warm air bypass passage that enables air heated by the heat exchanger to bypass the mixing chamber and flow directly to the outlets;
    a plurality of flow passage adjusters that are positioned within the air flow passage to channel the air through the air flow passage to selected ones of the outlets in response to selected conditioned air parameters;
    the plurality of flow passage adjusters including a warm air bypass adjuster that pauses at an intermediate position until a predetermined temperature parameter is achieved when being adjusted to, or from, a warm air bypass passage condition.

6. The automotive air conditioner of claim 5, wherein the air flow passage includes an outer air passage for introducing outer air into the housing, an inner air passage for introducing inner air into the housing, and an inner/outer air switching door member operative to control inner and outer air quantities introduced into the housing.

7. The automotive air conditioner of claim 6, wherein the warm air bypass adjuster pauses at an intermediate position when the air conditioner is switched from a full outer-air mode to a bi-level flow mode.

8. The automotive air conditioner of claim 6, wherein the warm air bypass adjuster pauses at an intermediate position when the air conditioner is switched from a bi-level flow mode to a full outer-air mode.

9. The automotive air conditioner of claim 5, wherein the plurality of flow passage adjusters further comprises main mix adjusters operative to adjust the quantity of air input through the heat exchanger and through the cool air bypass passage.

10. The automotive air conditioner of claim 5, further comprising an auxiliary heater operatively located in the warm air bypass passage that is enabled when the air conditioner operates in a bi-level flow mode.

11. An apparatus for controlling the supply of a temperature-controlled flowable substance, comprising:

a processor including a control program selectively enabled by user-selected inputs;

a housing that defines a plurality of outputs, a supply passage including an inlet for enabling the substance to be input into the housing, a heater to heat the input flowable substance, a first bypass passage located upstream from the heater that circumvents the heater, a mixing chamber that mixes that portion of the substance heated by the heater and that portion of the substance that flowed through the bypass passage, and that is in communication with certain of the outlets, and a second bypass passage located downstream from the heater that circumvents the mixing chamber, and that is in communication with certain of the outlets; and a bypass door that is selectively movable to open and close the second bypass passage in response to predetermined operating parameters from the controller, and that pauses between opened and closed positions during movement thereof, until predetermined substance parameters are met, to facilitate gradual substance quantity and temperature changes at the outlets when the apparatus is changed from a first operating state to a second operating state.

* * * * *